United States Patent [19]

Eckler

[11] 4,393,149

[45] Jul. 12, 1983

[54] METHOD OF PREPARING POLYURETHANE FOAMS USING IMIDAZOLINES AS CATALYSTS

[75] Inventor: Paul E. Eckler, Terre Haute, Ind.

[73] Assignee: Angus Chemical Company, Northbrook, Ill.

[21] Appl. No.: 363,719

[22] Filed: Mar. 30, 1982

[51] Int. Cl.³ .......................................... C08G 18/18
[52] U.S. Cl. .................................. 521/129; 521/128; 528/53
[58] Field of Search .................. 521/128, 129; 528/53, 528/54

[56] References Cited

U.S. PATENT DOCUMENTS

| | | | |
|---|---|---|---|
| 3,152,094 | 10/1964 | Erner et al. | 521/129 |
| 3,912,689 | 10/1975 | Bechara et al. | 521/129 |
| 4,189,543 | 2/1980 | Doorakian et al. | 521/128 |
| 4,212,952 | 7/1980 | Murphy et al. | 521/129 |
| 4,234,693 | 11/1980 | Wooler | 521/128 |
| 4,258,138 | 3/1981 | Britton | 521/128 |
| 4,297,443 | 10/1981 | Eckler et al. | 521/129 |

Primary Examiner—Lester L. Lee

Attorney, Agent, or Firm—Leydig, Voit, Osann, Mayer & Holt, Ltd.

[57] ABSTRACT

A method of catalyzing the curing of polyurethane foams formed by reacting a polyol with a diisocyanate in the presence of a blowing agent and a catalyst comprising using as the catalyst a compound of the formula

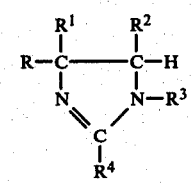

where R can be hydrogen, methyl, ethyl or $R^4CO_2CH_2$—; $R^1$ can be hydrogen, methyl, ethyl or $R^4CO_2CH_2$—; $R^2$ can be hydrogen or an alkyl group of 1-3 carbon atoms; $R^3$ can be alkyl of 1-4 carbon atoms or phenyl; and $R^4$ can be hydrogen, alkyl or alkenyl of 1-17 carbon atoms.

4 Claims, No Drawings

METHOD OF PREPARING POLYURETHANE FOAMS USING IMIDAZOLINES AS CATALYSTS

BACKGROUND OF THE INVENTION

This invention relates to a method of producing polyurethane foams.

In a particular aspect, this invention relates to a method of producing polyurethane foams by using a substituted imidazoline as a catalyst therefor.

Catalysts for curing polyurethane foams prepared from isocyanates and polyols to produce rigid objects are well-known and are used commercially in large quantities. Such catalysts should be free from hydroxy groups and primary and secondary amine groups because these groups are reactive with the isocyanates. In addition to being non-reactive, a suitable catalyst should promote curing at a rapid rate. While several stages of curing are involved, the most important is the time required to produce a firm foam, for that determines the length of time the foam remains in the mold, and hence the production rate for any given mold. Presently used catalysts, while satisfactory, are expensive and consequently a catalyst having a lower cost or lower firm time is needed in the art.

SUMMARY OF THE INVENTION

It is an object of this invention to provide a method of producing polyurethane foams.

It is another object of this invention to provide a method of producing polyurethane foams by using an imidazoline as a catalyst therefor.

Other objects of this invention will be apparent to those skilled in the art.

It is the discovery of this invention to provide a method of catalyzing the curing of polyurethane foams formed by reacting a polyol with a diisocyanate in the presence of a blowing agent and a catalyst comprising using as the catalyst a substituted imidazoline of the formula

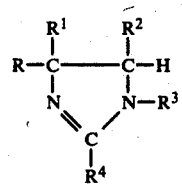

where R can be hydrogen, methyl, ethyl or $R^4CO_2CH_2-$; $R^1$ can be hydrogen, methyl, ethyl or $R^4CO_2CH_2-$; $R^2$ can be hydrogen or an alkyl group of 1-3 carbon atoms; $R^3$ can be alkyl of 1-4 carbon atoms or phenyl; and $R^4$ can be hydrogen, alkyl or alkenyl of 1-17 carbon atoms.

DETAILED DISCUSSION

According to the method of the present invention, an imidazoline of the above formula is mixed with the ingredients used to form the foam shortly before the formed article is to be manufactured. Preferably, the imidazoline is mixed with the polyol and since no reaction takes place, the mixture can be prepared as far in advance as is desirable. The mixture can also contain other additives as is known in the art. The amount of imidazoline used varies from about 0.1 to about 2% based on the polyol. For rigid foams, about 1.0 to 2.0 parts per 10 parts of polyol yields excellent results and for flexible foams, about 0.1 to 0.5% is preferred.

The formulation of mixtures for producing polyurethane foams is well-known in the art and forms no part of the present invention. The imidazolines of the present invention can be used with any known foam-producing formulation.

The preferred compound for the practice of this invention is 1,4,4-trimethyl-2-imidazoline.

The imidazoline compounds useful in the practice of this invention, are readily prepared by processes known in the art. Their preparation is given in the examples, but in general can be effected by reacting a 1,2-diamine of the formula

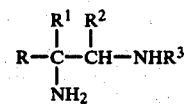

with a carboxylic acid of the formula $R^4COOH$ in accordance with the method of J. L. Riebsomer, J. Am. Chem. Soc. 70, 1629–32 (1948), which is incorporated herein by reference thereto. Typical diamines can be prepared by the method of Senkus, U.S. Pat. No. 2,393,825 or Johnson, U.S. Pat. No. 2,408,172.

The invention will be better understood with reference to the following examples. It is understood that the examples are intended only to illustrate the invention and it is not intended that the invention be limited thereby.

EXAMPLE 1

1,4,4-Trimethylimidazoline, prepared from N'-methyl-2-aminoisobutylamine and formic acid, was tested as a rigid polyurethane foam catalyst and compared with a widely-used commercial catalyst, N,N-dimethylcyclohexylamine. The following formulation was used:

|  | Control | Test |
|---|---|---|
| Polyol | 116 parts | 116 parts |
| Silicone Surfactant | 1 | 1 |
| Foamrez UL-8 | 1.05 | 1.05 |
| N,N—Dimethylcyclohexylamine | 1.5 | — |
| TMI | — | 1.5 |
| Fluorcarbon blowing agent | 35 | 35 |
| Isocyanate | 130 | 130 |

The following observations were made:

| Foam Speeds | Control | Test |
|---|---|---|
| Cream time | 45 sec | 56 sec |
| Set time | 56 | 67 |
| Tack-free time | 60 | 70 |
| Rise time | 60 | 70 |
| Firm time | 60 | 70 |

EXAMPLE 2

2-Nitromethylmethylpropanol is reacted with methylamine to form N-methyl-2-nitromethylpropylamine which is hydrogenated to the diamine. The latter is then reacted with acetic acid to form 1,2,4,4-tetramethyl-2-imidazoline. It is tested as a polyurethane foam catalyst by the method of Example 1 and is found to be effective.

EXAMPLE 3

2-Nitromethyl-1,3-propanediol is reacted with n-butylamine to form N-butyl-2-nitromethyl-4-methyl-4-hydroxymethylpropylamine which is then hydrogenated to the diamine. The latter is then reacted with 2 moles of propionic acid to form the propionic ester of 4-methyl-4-hydroxymethyl-2-ethyl-1-butyl-2-imidazoline. It is tested as a polyurethane foam catalyst by the method of Example 1 and is found to be effective.

EXAMPLE 4

2-Nitro-2-hydroxymethyl-1,3-propanediol is reacted with aniline to form N-phenyl-2-nitro-1,3-propanediol. It is hydrogenated to form the diamine which is then reacted with 3 moles of oleic acid to form the bis-oleic acid ester of 4,4-bis(hydroxymethyl)-1-phenyl-2-heptadecenyl-2-imidazoline. It is tested as a polyurethane foam catalyst by the method of Example 1 and is found to be an effective catalyst.

I claim:

1. A method of catalyzing the curing of polyurethane foams formed by reacting a polyol with a diisocyanate in the presence of a blowing agent and a catalyst comprising using as the catalyst a compound of the formula

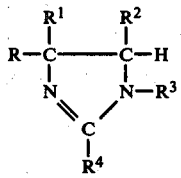

where R can be hydrogen, methyl, ethyl or $R^4CO_2CH_2-$; $R^1$ can be hydrogen, methyl, ethyl or $R^4CO_2CH_2-$; $R^2$ can be hydrogen or an alkyl group of 1-3 carbon atoms; $R^3$ can be alkyl of 1-4 carbon atoms or phenyl, and $R^4$ can be hydrogen, alkyl or alkenyl of 1-17 carbon atoms.

2. The method of claim 1 wherein the catalyst is present in a proportion of from 0.1 to about 2% based on the weight of the polyol.

3. The method of claim 1 wherein the catalyst is used in a proportion of from 1 to 2 parts per 100 parts of polyol.

4. The method of claim 1 wherein the polyurethane foam is a flexible foam and the catalyst is used in a proportion of from 0.1% to about 0.5% based on the weight of the polyol.

* * * * *